(12) United States Patent
Chan et al.

(10) Patent No.: US 7,335,843 B2
(45) Date of Patent: Feb. 26, 2008

(54) COMPUTER KEYBOARD BACKLIGHTING

(75) Inventors: Sam E. J. Chan, Kowloon (HK); King Sum Chu, Kowloon (HK); W. Edward Church, Boise, ID (US); Randall Krafft, Tampa, FL (US); W. Steve Rector, Tampa, FL (US); Will R. Harwood, Tampa, FL (US)

(73) Assignee: FireFly International, Inc., Tampa, FL (US)

( * ) Notice: Subject to any disclaimer, the term of this patent is extended or adjusted under 35 U.S.C. 154(b) by 0 days.

(21) Appl. No.: 11/061,118

(22) Filed: Feb. 18, 2005
(Under 37 CFR 1.47)

(65) Prior Publication Data
US 2006/0011461 A1    Jan. 19, 2006

Related U.S. Application Data

(63) Continuation-in-part of application No. 09/996,353, filed on Nov. 27, 2001, now Pat. No. 6,871,978, which is a continuation-in-part of application No. 09/439,846, filed on Nov. 12, 1999, now Pat. No. 6,322,229.

(60) Provisional application No. 60/108,310, filed on Nov. 13, 1998.

(51) Int. Cl.
*H01H 9/00* (2006.01)
(52) U.S. Cl. .................... 200/310; 200/314
(58) Field of Classification Search ............ 200/310
See application file for complete search history.

(56) References Cited

U.S. PATENT DOCUMENTS 3,856,127 A    12/1974    Halfon et al. ............... 197/98

(Continued)

FOREIGN PATENT DOCUMENTS

DE    3535217    4/1986

(Continued)

OTHER PUBLICATIONS

European Supplemental Search Report, dated May 6, 2003, in a European Patent Application derived from related PCT Application.

(Continued)

*Primary Examiner*—Elvin Enad
*Assistant Examiner*—Lheiren Mae A. Anglo
(74) *Attorney, Agent, or Firm*—Pederson & Co., PLLC; Ken J. Pedersen; Barbara S. Pedersen

(57) ABSTRACT

Embodiments of a peripheral backlighting system for keyboards are shown and described, which include one or more light-emitting panels exterior to the keyswitches of the keyboard. The panels are preferably electroluminescent material or light-emitting chemical cells and surround at least two sides, and preferably all sides, of the actuation portion of a keyswitch or the space in which the actuation portion slides up and down during use. Alternatively, the panel(s) may extend substantially continuously between and underneath a plurality of keyswitches. The panels extend closely adjacent to the actuation portion or actuation path, or under the keyswitch, to be as far under the key cap as possible without extending into the keyswitch. Preferably, the keyswitch is translucent or partially translucent, and the housing plate over the light-radiant panels, if any, is at least partially translucent or transparent. This way, the light from the light-emitting panels radiates upward through, and preferably around the outer surface of, the translucent keycaps, rather than up through an aperture or lightpipe in the center of the keycaps.

4 Claims, 11 Drawing Sheets

U.S. PATENT DOCUMENTS

| | | | | |
|---|---|---|---|---|
| 4,060,703 A | 11/1977 | Everett, Jr. | ..................... | 200/5 |
| 4,320,268 A | 3/1982 | Brown | ........................... | 200/5 |
| 4,379,968 A | 4/1983 | Ely et al. | ..................... | 250/229 |
| 4,551,717 A | 11/1985 | Dreher | ....................... | 340/712 |
| 4,617,461 A | 10/1986 | Subbarao et al. | ........... | 250/229 |
| 4,667,273 A | 5/1987 | Queudray | ..................... | 362/34 |
| 4,772,769 A | 9/1988 | Shumate | ..................... | 200/314 |
| 4,806,908 A | 2/1989 | Krupnik | ...................... | 341/22 |
| 4,811,175 A | 3/1989 | DeSmet | ....................... | 362/95 |
| 4,812,831 A | 3/1989 | Laier | .......................... | 340/711 |
| 4,814,566 A | 3/1989 | Sigl | ........................... | 200/305 |
| 4,882,581 A | 11/1989 | Inobe et al. | .................... | 341/22 |
| 4,931,794 A | 6/1990 | Haag et al. | .................... | 341/31 |
| 5,034,602 A | 7/1991 | Garcia, Jr. et al. | ....... | 250/227.22 |
| 5,073,843 A | 12/1991 | Magee | ....................... | 362/84 |
| 5,083,240 A | 1/1992 | Pasco | ......................... | 362/26 |
| 5,138,119 A | 8/1992 | Demeo | ......................... | 200/5 |
| 5,149,923 A | 9/1992 | Demeo | ......................... | 200/5 |
| 5,151,696 A | 9/1992 | Kasahara et al. | ............. | 341/22 |
| 5,266,949 A | 11/1993 | Rossi | ......................... | 341/22 |
| 5,397,867 A | 3/1995 | Demeo | ......................... | 200/5 |
| 5,430,267 A | 7/1995 | Ozeki et al. | ............ | 200/302.2 |
| 5,510,782 A | 4/1996 | Norris et al. | ................. | 341/22 |
| 5,565,733 A | 10/1996 | Krafcik et al. | ............. | 313/510 |
| 5,581,251 A | 12/1996 | McRight et al. | .............. | 341/22 |
| 5,612,692 A | 3/1997 | Dugas et al. | ................. | 341/22 |
| 5,664,860 A | 9/1997 | Berardi | ....................... | 362/23 |
| 5,677,546 A * | 10/1997 | Yu | .............................. | 257/40 |
| 5,708,428 A | 1/1998 | Phillips | ....................... | 341/22 |
| 5,736,233 A | 4/1998 | Fye | ............................ | 428/804 |
| 5,747,756 A | 5/1998 | Boedecker | .................. | 200/5 A |
| 5,797,482 A | 8/1998 | LaPointe et al. | ............ | 200/314 |
| 5,799,233 A | 8/1998 | Ishii et al. | .................. | 399/175 |
| 5,801,345 A | 9/1998 | Mikula-Curtis et al. | .... | 200/5 A |
| 5,811,930 A | 9/1998 | Krafcik et al. | ............. | 313/510 |
| 5,821,482 A | 10/1998 | Ootani et al. | ............... | 200/5 A |
| 5,899,553 A | 5/1999 | Howell | ........................ | 362/84 |
| 5,938,772 A | 8/1999 | Welch | ........................ | 713/320 |
| 5,960,942 A | 10/1999 | Thornton | ..................... | 200/314 |
| 5,971,557 A | 10/1999 | Kubes et al. | ................. | 362/24 |
| 5,977,901 A * | 11/1999 | Fenner | ...................... | 341/176 |
| 6,006,118 A | 12/1999 | Stephenson | ................. | 455/575 |
| 6,179,432 B1 | 1/2001 | Zhang | ......................... | 362/84 |
| 6,199,996 B1 * | 3/2001 | Katrinecz et al. | ............. | 362/85 |
| 6,246,169 B1 * | 6/2001 | Pruvot | ........................ | 313/506 |
| 6,357,887 B1 | 3/2002 | Novak | ........................ | 362/26 |
| 6,467,924 B2 | 10/2002 | Shipman | ...................... | 362/31 |
| 6,590,508 B1 | 7/2003 | Howell et al. | ................ | 341/22 |
| 2004/0223318 A1 | 11/2004 | Katrinecz | .................... | 362/85 |

FOREIGN PATENT DOCUMENTS

| | | |
|---|---|---|
| EP | 1 108 183 | 7/1999 |
| JP | 09038654 | 2/1997 |

OTHER PUBLICATIONS

Translation of DE 3535217.

* cited by examiner

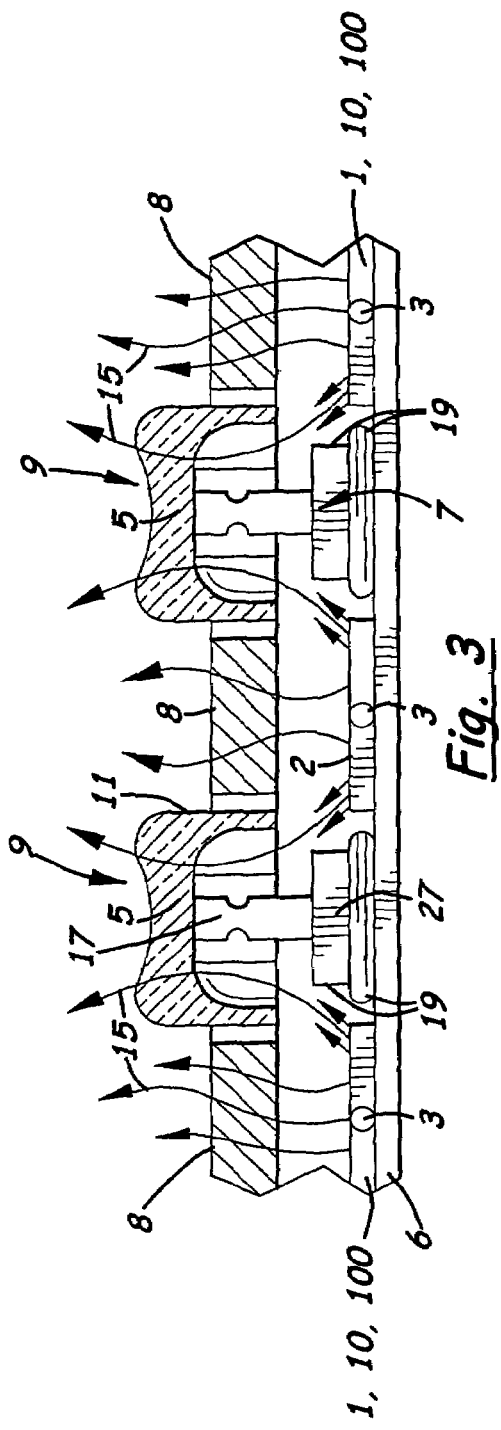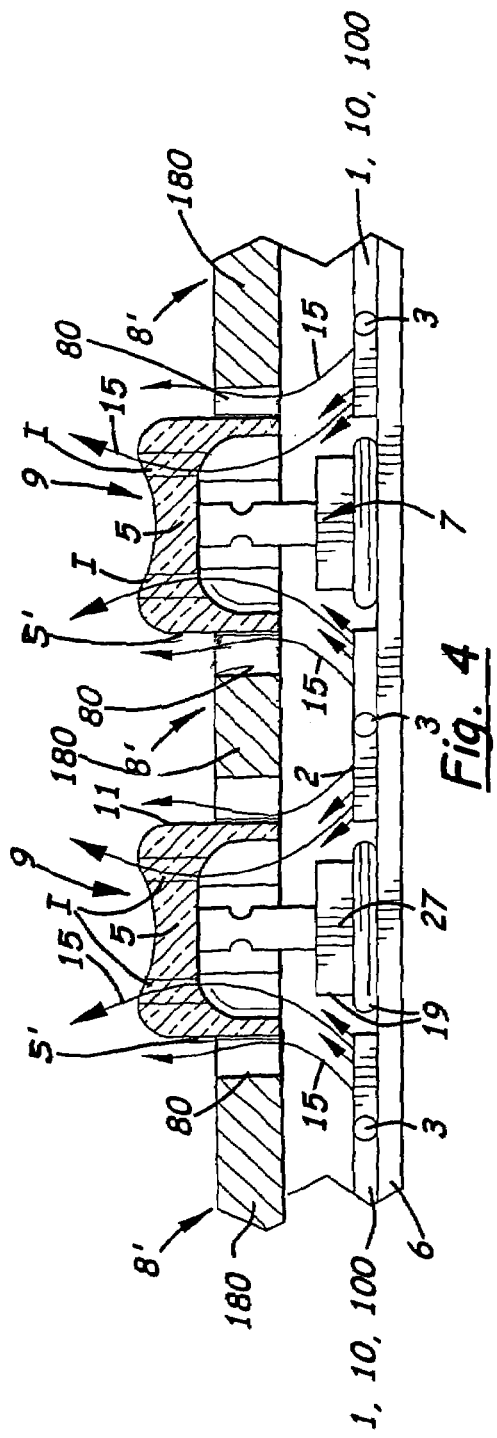

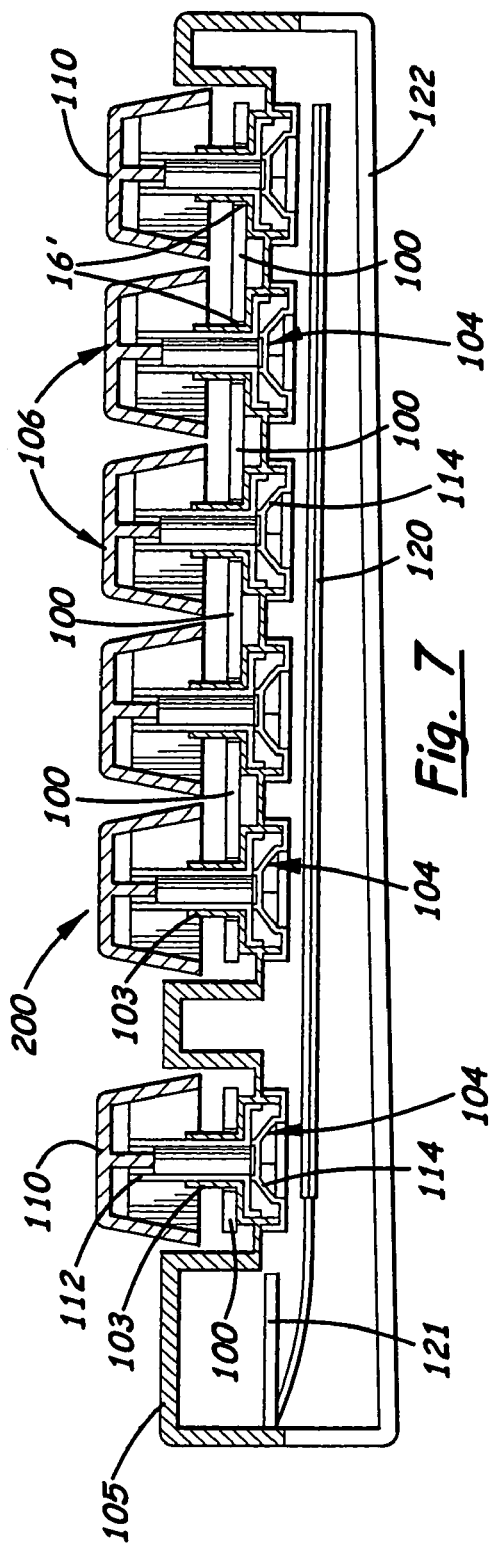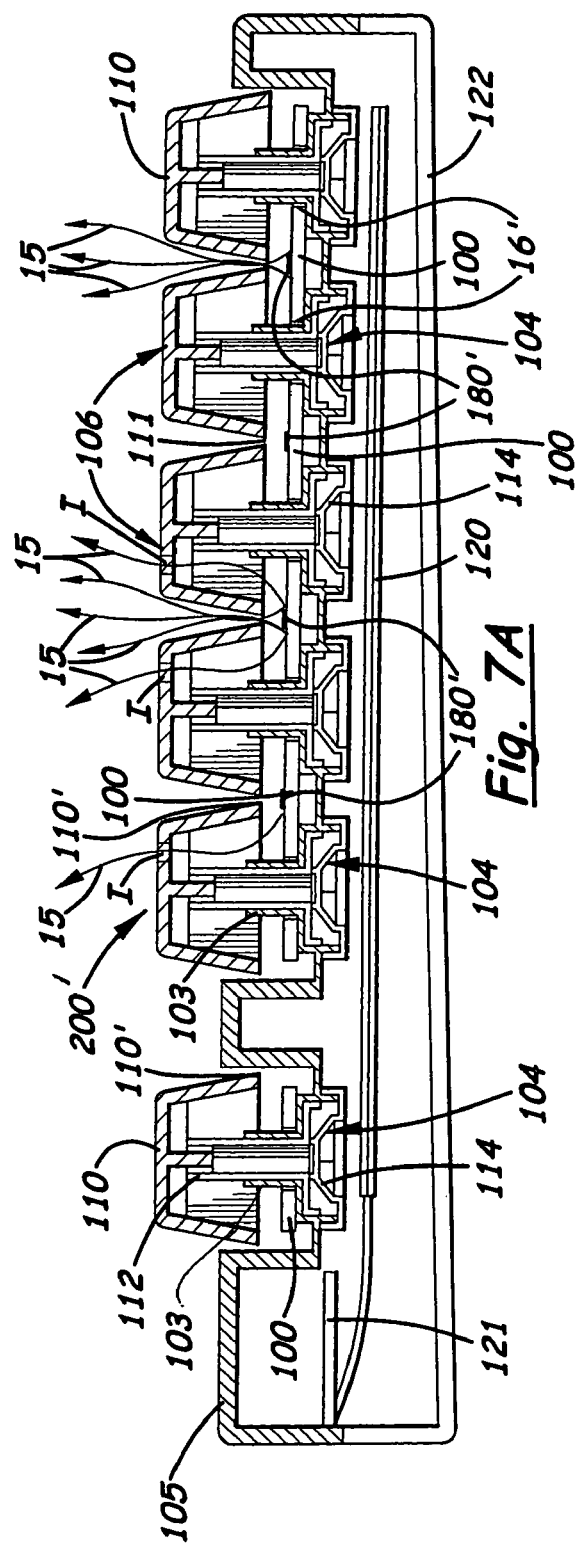

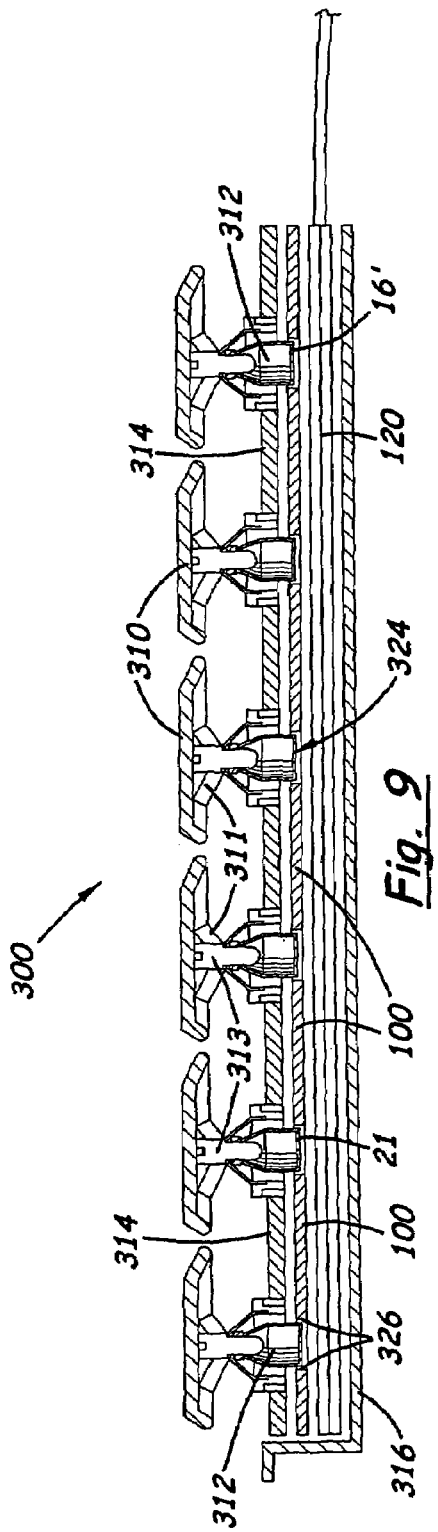
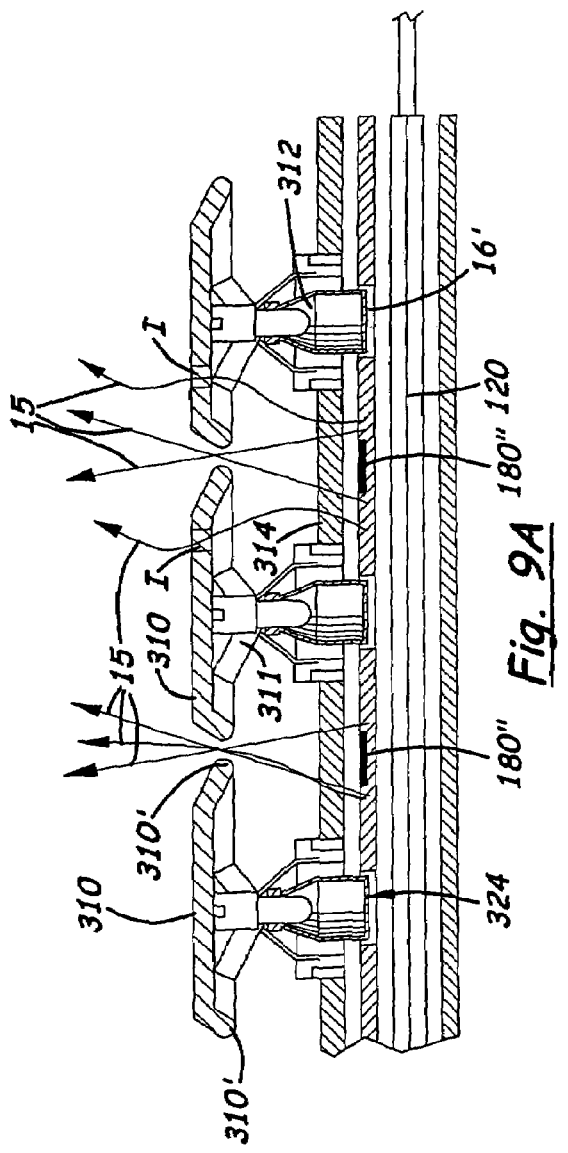
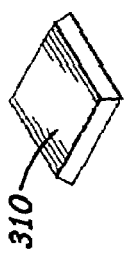
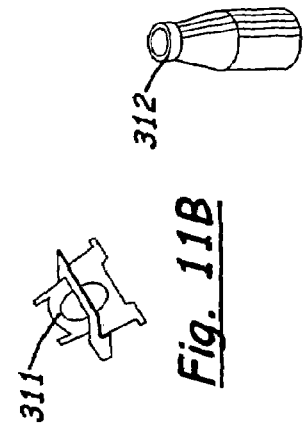

COMPUTER KEYBOARD BACKLIGHTING

This application is a continuation-in-part, and claims priority, of U.S. patent application Ser. No. 09/996,353, filed Nov. 27, 2001 now U.S. Pat. No. 6,871,978, entitled "Computer Keyboard Backlighting," which is a continuation-in-part, and claims priority, of U.S. patent application Ser. No. 09/439,846, filed Nov. 12, 1999, entitled Backlighting for Computer Keyboard, and issuing on Nov. 27, 2001 as U.S. Pat. No. 6,322,229, which claims priority of U.S. Provisional Patent Application Ser. No. 60/108,310, filed on Nov. 13, 1998, entitled "Backlighting of Keyswitch Assemblies."

BACKGROUND OF THE INVENTION

1. Field of the Invention

This invention pertains, in general, to lighting devices for keyswitch assemblies and keyboards, such as computer desktop, laptop, and notebook keyboards or "Internet-TV" keyboards. More specifically, the invention relates to backlighting for keyboards that originates from below the keycaps within the keyboard.

2. Related Art

For a long time, keyswitch assembly operators have desired lighted keyboards and keypads. For example, when an operator is working a computer keyboard and simultaneously viewing a computer monitor, low ambient light conditions may be preferred, in order to maximize contrast on the monitor screen. Also, for example, a portable computer operator may by necessity be in a low light environment, as when flying in an airplane or riding in a train at night.

In any event, there have been many attempts in the prior art to provide lighted keyboards and keypads. Still, many of these attempts have not been successful because they result in keyswitch assemblies that are not sufficiently lighted, or lighted in a glaring or distracting manner, or that are inconvenient, or expensive. Prior attempts at lighted keyboards have produced fragile systems that consume more power and produce more heat than is desirable.

Examples of lighted keyswitch assemblies are found in the patent literature. U.S. Pat. No. 5,801,345 (Mikula-Curtis et al., 1998) discloses LED's attached to the bottom of the printed circuit board (PCB) which emit light that travels up through holes in the PCB and into light pipes, each of which is received in a key cap to channel the light up through the interior of the key cap. Also, the Mikula-Curtis et al. system includes a backlighting system with an LED centered under a light dam and an indicia panel, that emits light up through the center of the area enclosed by the light dam to back-light the indicia panel.

U.S. Pat. No. 5,612,692 (Dugas et al., 1997) discloses a sealed, LED-lighted keyboard, in which the LEDs are disposed on the printed circuit board. The LEDs and circuit board are covered by a spacer board with openings for allowing electrical contact with the top surface of the circuit board and for allowing LED light to reach the upper layers of the system. These "upper layers" include a translucent sealing sheet membrane with domes, and keys above the domes. Thus, in Dugas, the keys are pushed down to force the domes down so that a conductive under-surface of the key may contact the circuit board. The LED light must travel up through the spacer board holes, through the center of each dome, up through the center of each key, and out the translucent number, letter, or other indicia on the top center of the key cap.

U.S. Pat. No. 5,034,602 (Garcia, et al., 1991) discloses a backlighting system in which a light emitter, such as an alpha/numeric LED or LCD, is disposed beneath the center of the key cap or adjacent to a beam splitter that redirects the light up through the central axis of the key cap.

U.S. Pat. No. 4,806,908 (Krupnik, 1989) discloses a system using electroluminescent (EL) strips that extend through registering openings that extend transversely through the stems of the key switches in the keyboard. The EL strips extend from key stem to key stem underneath an opaque, stationary retaining panel being between the keys, so that only the key cap is lit only by light that is emitted from the area of the EL strips inside the key stems (the "internal portion") and that travels up to the cap of the key. This light from the internal portion of the EL strip travels up through the center of the clear, transparent, or translucent body of the key stem and then to openings or translucent areas in the center of the otherwise opaque key cap. Because the EL strips run underneath the opaque retaining panel and through openings in the stems of a plurality of keys, the EL strips are also adapted to prevent withdrawal of the keys from the retaining panel.

Summarily, therefore, conventional backlighting techniques feature means for channeling/directing light directly up through the center of the key cap or of the area directly under the indicia panel to be lit. This approach purposely controls the light to travel along a specific central axis and then to radiate from the keyboard in a limited area of a single key cap or of a single indicia panel. This approach purposely controls and limits the light path, to prevent light from traveling from keyswitch to keyswitch or from shining from the inside of the keyswitch to the outside of the keyswitch. This conventional approach, therefore, lights the keys in such a way that they look like spots of light against a dark background.

What is still needed is a durable, economical and effective backlighting system for a desktop, laptop, notebook, or "Internet-TV" keyboard. What is needed is such a system that supplies appropriate levels of light in the appropriate areas of the keyboard for enhanced viewing in low/no light environments.

SUMMARY OF THE INVENTION

In a first group of embodiments, a keyboard for use in low or no ambient light environments is provided, by peripherally lighting the keyswitch assemblies on a keyboard or keypad, such as a desktop, laptop, notebook, or Internet-TV keyboard. By "peripherally lighted," it is meant that the keyswitch assemblies are lit externally, from outside rather than from inside, preferably from positions substantially circumscribing the sides and/or extending across the bottom of the keyswitch assemblies. Light emanates from all or portions of a panel that extends between and/or underneath a plurality of keyswitches of a keyboard. The panel may be a sheet or strip that extends between keyswitches and preferably reaches underneath the keycaps, by extending near to the actuation portion or actuation path of a keyswitch, and/or by extending underneath the keyswitches. Preferably, in this first group of embodiments, light emanates up from the radiant panel through the spaces between the keyswitches, and into and through the keyswitches, to give the selected portions of the keyboard an overall "glowing" appearance, rather than giving the keyboard the appearance of having "spots" of light or lighted letters and numerals. Preferably, light emanates up from the radiant panel through the spaces between the keyswitches to provide light around the keycap outer perimeter. In a preferred embodiment, keycaps are generally opaque with translucent or transparent indicia, and light emits up around the keycap outer perimeter and up through the indicia. Such an embodiment provides pleasant "outlining" of the keys via the light between the keys and identification of the keys via the light through the indicia. This lighting aids key identification and overall visibility in many low/no light environments, and makes laptop lighting possible while traveling because of low power consumption.

The radiant panel in said first group of embodiments may be electroluminescent (EL) material positioned above the contact membrane or printed circuit board and generally below the keyswitch caps. Inorganic and/or organic electroluminescent material may be used. In embodiments in which the EL material comprises strips or a sheet with perforations, the strip edges or perforation edges are disposed on at least two sides of, and preferably entirely or substantially around, the key actuation portion or the space through which the actuation portion travels during depression of the key ("actuation path"). In embodiments in which the EL material comprises a continuous sheet of material, the sheet extends generally horizontally underneath a plurality of keyswitches between the contact membrane and the lower-most extremity of the keyswitch. When a key is depressed, the continuous sheet is impacted by the contact member of the keyswitch, and transfers force to the contact membrane to execute the "switch." Thus, at a minimum, the EL material preferably extends underneath the peripheral edges of the key cap, or at a maximum, the EL material extends all the way under the key, either scenario allowing a significant amount of light to pass into and up through the keyswitches, and preferably also between the spaces between the keyswitches. The panel and EL material preferably do not extend into the interior of the key cap or key actuation portion, and do not interfere with operation or removal of the key.

Alternatively, other radiant panels may be used for said first group of embodiments. A keyboard including a radiant panel comprising, or consisting, of light-emitting electrochemical cell ("LEC") is an especially-preferred embodiment in said first group of embodiments and exhibits increased power efficiency.

In a second group of embodiments, the light may be provided only in selected areas under the keycaps, for example, either by providing small radiant panels under the keycaps but not between the keycaps, and/or a larger panel that preferably radiates only in the selected areas under the keycaps by virtue of selective deposition of the radiating material or by substantial masking of the panel around the selected areas. In this second group of embodiments, the radiant panel(s) may be inorganic and/or organic electroluminescent material, LEC, and/or other radiant panels.

In this and the following Description and claims, the term "keyboard" refers to a device including keys for inputting information, including a keyboard for a desktop computer, a keypad for a laptop computer with or without a touch pad and/or right and left controls, mouse, or other pointing means. The terms "keyswitch assembly" or "keyswitch" or "key" refer to the device conventionally provided in keyboards that is depressed to make contact with and affect (close) its particular switch on the circuit board or membrane (PCB or contact membrane). A keyswitch is typically made of a "cap" or "cap portion" for finger contact or other contact by the user during use of the keyboard, and an "actuation portion" that transfers the force applied to the cap portion to effect the switching in the circuit board or membrane. Thus, the cap portion and actuation portion of a keyswitch typically will have one or more components with enough rigidity to receive force from the user and transmit force to the circuit board or membrane when the keyswitch is pushed into a lowered position, and one or more members with enough resilience to urge the keyswitch into its upward position when the force from the user is released. The actuation portion typically has a lower region that contacts or otherwise operatively cooperates with the circuit board or membrane and an upper region that contacts or otherwise operatively cooperates with the cap portion, wherein the cap portion has an upper, generally horizontal surface exposed for contact by the user. Therefore, conventional computer keyswitch assemblies typically feature an arrangement wherein the cap portion is exposed for contact by the user and the actuation portion extends between the cap portion an the circuit board or membrane, so that the cap portion is on top of the actuation portion. Because of this general arrangement, the terms "cap" or "keycap", and "key stem" or "stem", have been used for the generally horizontal structure, and the generally vertical structure, of computer keyswitch assemblies, respectively. The actuation portion or key stem may include one or more of the following: downwardly-protruding posts or other rigid or semi-rigid members, inserts, sleeves, domes, rubber-like biasing members, and/or sleeves, domes, or biasing members with a member (integral to them or connected to them) that has enough rigidity to make contact with the circuit board or membrane and effect switching. "Cap" and "cap portion" may include the user-contact structure of many different currently-available, and future, conventional keyswitches. "Actuation portion" and "key stem" may include the actuation structure of many different currently-available, and future, conventional keyswitches. As will be understood by one of skill in the art of keyboard design, many different cap designs and different actuation/stem designs result in an operable computer keyswitch, for example, cap portions that are a separate part operatively connected to the actuation portion, and/or cap portions that are integral with, or have some portion that is integral with, part of the actuation portion.

In the Description and claims, the term "substantially continuous panel" means that a panel extends without significant apertures or interruptions except for apertures that are used to receive a portion of the keyswitch such as the actuation portion or to reach near to the actuation portion but leave a space for the actuation path, that is, for the actuation portion to move in and out of the aperture. The term "continuous panel" means that the panel extends without significant apertures or interruptions, for example, panels that have no apertures for receiving the keyswitch actuation portions. The inventors envision that a single continuous panel would be beneficial in a laptop computer keyboard that would have no keyswitch actuation portion apertures but would have a hole through the membrane for receiving a "mouse ball" mechanism, for example. The term "extending between" means that a panel extends from keyswitch to keyswitch on any number of planes that are near the keyswitches and generally parallel to the plane of the keyswitches, and is not intended to limit the panel location to one particular plane passing through the midpoint of the keyswitches.

One or more panels comprising EL, LEC, or other radiant material may be laid down between keyswitches and around the actuation portion or underneath the keyswitches, in one or more areas of the keyboard. The panels may be of various regular or irregular shapes to backlight particular areas of the keyboard, and the panels may radiate light over all or substantially all of their top surfaces, or may have areas masked, deactivated, or otherwise prevented from radiating light so that not all of the panel radiates light. Preferred panels are herein described in two general categories, sheets and strips, wherein a sheet typically extends between more than two rows of keys and/or more than two columns of keys, and a strip typically extends between only two rows of keys or between only two columns of keys. Several different panels may be provided, for easier design and installation, or for being separately-powered for independent on/off or dimming control. Also, radiant panels may be used that provide different colors of backlighting, for differentiating different areas of the key board. Also, not all areas of the keyboard need to be lit.

The keycaps may be molded using translucent plastic and have opaque markings or portions on their tops, and the actuation portion, and other parts of the keyswitches preferably have translucent, transparent, or reflective portions, so that the keyswitch as a whole tends to transfer or reflect light. Alternatively, the keycap may be partly or substantially opaque, with translucent or transparent letter, number, or other indicia.

The radiant panel(s) may be positioned directly underneath a translucent or transparent "base plate" that is the uppermost portion of the housing of the keyboard, or otherwise inside the keyboard housing. Alternatively, the radiant panel(s) may be positioned above a base plate, resting on or above the base plate, or installed in the keyboard without there being a base plate. In other words, the radiant panel may be positioned above, or on top of, the keyboard housing (preferably above or on the uppermost plate of the housing), or the radiant panel may be positioned underneath the caps as the uppermost generally horizontal panel of the keyboard, whether or not there is a housing upper plate underneath it.

This way, because the EL material, LEC, or other radiant panel(s) preferably extend(s) across substantially the entire distance between keys, and optionally across the entire distance outside and beneath the keys, the preferred radiant panel light travels upward through and around the translucent/translucent portion keycaps and up through the base plate, thereby backlighting selected portions or substantially the entire top of the keyboard, to "fill" the keyboard surface with light. Alternatively, in embodiments wherein the radiant panel is above or on top of the top panel of the housing, or wherein there is no top panel of the housing, the radiant panel light travels upward through and around the translucent/translucent portion keycaps, thereby backlighting selected portions or substantially the entire top of the keyboard, to "fill" the keyboard surface with light. Thus, said first group of embodiments do not feature only the interior lighting, that is, the limited, controlled "light pipe" or axially-channeled light approach discussed in the Related Art section. Instead, said first group of embodiments produces a subtle, overall lighted effect that yet is not overwhelming or distracting. Having light "glow" from between the keycaps as well as from portion(s) of, or substantially all of, the keycaps is surprisingly effective, and produces a "plane of light" effect, giving the user enough subtle light to see and use the keyboard without having "spots" of light or indicia only lit up on top of the key caps. Having light "glow" around the outer perimeter of the keycaps defines the perimeter of the keycap for the user, which makes use of the keyboard in low light conditions easier for many users, and which presents a more pleasing and subtle effect compared to prior art lit keyboards featuring "spots of light" against a dark background.

In many embodiments, light emits up between the keycaps only near the outer perimeters of the keycaps to shield a user's eyes from the bright light-emitting areas of the preferred EL or LEC panel. Preferably, this is done by providing masking or opaque areas on a base plate, or by providing non-light-emitting areas on the EL or LEC panel by various means, including masking, deactivating, or manufacture of the EL or LEC panel to only radiate in certain areas and not in others. The masked or non-light-emitting area is directly below the gap between the keycaps, preferably generally centered below the gap, and preferably extends a distance at least equal to the width of the gap, but not completely blocking light from radiating up through the gap. Because of the nature of light, the positioning of the masked or non-light-emitting area, which is preferably directly below the gap but not extending all the way to the key actuation portions/stems, allows light to radiate around/past the masked or non-light-emitting areas and up through the gaps, by means of the light radiating at an angle through the gap or reflecting off of actuation portions, stems, hinges, or caps, and then radiating out of the gap to the user's eyes. The positioning of the masked or non-light-emitting areas inhibits light from radiating from the area directly under the center of the gap, and thus inhibits or limits the user's direct view of the bright EL or LEC material during normal use with the user seated in front of the keyboard at a normal level relative to the keyboard.

The radiant EL or LEC panels are preferably powered by the computer keyboard port, via voltage inverters which are commercially available for such use. Preferably, one or more dimming, on/off, and auto-off control systems are included in the invented system. The light may be normally off, for example, but turned on by a switch or designated keystrokes. The preferred controls may be used to adjust the intensity of the backlighting in some or all portions of the backlit keyboard. Also, controls may be used to automatically shut off lighting during extended non-use, for battery conservation, and restart it when one or more keystrokes are made, either any keystroke(s) or specific designated keystrokes programmed to be the command for the light to come on. Alternatively, a switch may be used to restart the lighting, such as a slide switch or other mechanism. In addition, the preferred controls may be used to independently dim or turn off the lighting of all or selected portions, for example, to produce increased differentiation between the lit portions and the dimmed or non-lit portions.

The invented backlighting system allows easier key identification for fewer input errors, for example, for late night use without disrupting sleeping family members and use on airplanes. The invented system allows a user to accurately and comfortably use the keyboard after purposely darkening a room to reduce glare and shadows. The overall-lighted keyboard may reduce eye fatigue that otherwise may occur when constantly moving the eyes from a lighted monitor to an un-lit keyboard. The intensity adjustment option gives users the ability to adjust the keyboard lighting for their own personal comfort and room conditions.

Another objective of the invented system is to provide a durable lighting system that results in a durable and low-maintenance keyboard. The invented system may use conventional, solid keyswitches without hollow centers, and does not require hollow key stems or special modifications to keyswitches, except for the preferred change to translucent materials. The invented system does not significantly increase the temperature of the keyswitches. The invented system does not require electronic or other complex connections of lighting members to the keyswitches. The preferred system therefore provides an economical lighting mechanism that does not reduce the reliability and life of the keyboard.

The invented backlighting system utilizes commercially-available lighting members, in such a way as to provide a system of efficient, glare-free and low-cost keyboard illumination. The invented system of lighting can be made into any shape of size, for design into new keyboard assemblies, or retrofitting onto existing keyboards, as will be more fully described in the detailed specification which follows.

BRIEF DESCRIPTION OF THE DRAWINGS

FIG. 3 is a schematic cutaway side view of an embodiment of the invention wherein EL or other radiant panels radiate light up between the keyswitch keycaps through a translucent base plate and up through the keycaps.

FIG. 4 is a schematic cutaway side view of the embodiment of FIG. 3 with a partially-opaque top housing plate, showing EL or other radiant panels radiating light up through the keycaps and around the outer perimeter of the keycaps.

FIG. 7 is an end, cross-sectional view of one embodiment of a desk-top keyboard, according to the invention, showing a perforated panel of EL or other radiant material around the key actuation assemblies and the collar which supports the actuation portion.

FIG. 7A is an end-cross-sectional view of the embodiment of FIG. 7, with portions of the EL or other radiant panel made to be non-light-emitting to moderate light radiating up centrally between the keycaps while allowing light to radiate up around the outer perimeters of the keycaps.

FIG. 9 is an end, cross-sectional view of one embodiment of a lap-top keyboard, according to the invention, showing a perforated panel of EL or other radiant material around the key stem paths.

FIG. 9A is an end-cross-sectional view of the embodiment of FIG. 9, with portions of the EL or other radiant material deactivated to moderate light radiating up centrally between the keycaps while allowing light to radiate up around the outer perimeters of the keycaps.

FIG. 11A is an enlarged view of the key cap of FIGS. 9 and 10.

FIG. 11B is an enlarged view of the hinge of FIGS. 9 and 10.

FIG. 11C is an enlarged view of the rubber actuator of FIGS. 9 and 10.

DESCRIPTION OF THE PREFERRED EMBODIMENTS

Figure 1A:
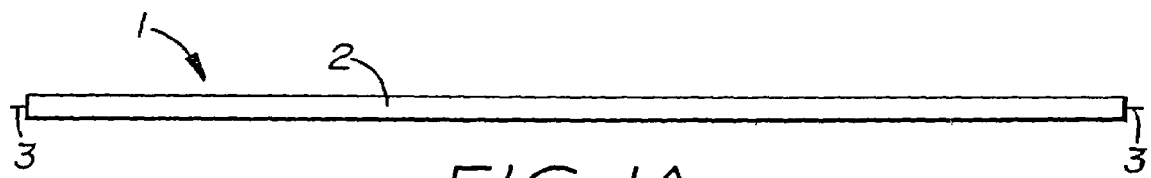
FIG. 1A is a top view of one embodiment of a strip-shaped EL or other radiant panel, according to one embodiment of the invention.
Figure 1B:
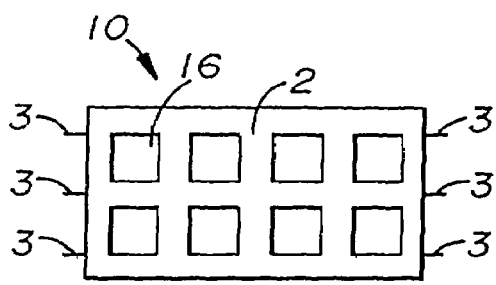
FIG. 1B is a top view of an embodiment of a die-cut sheet-style EL or other radiant panel with rectangular apertures for receiving keyswitch actuation portions.
Figure 1C:
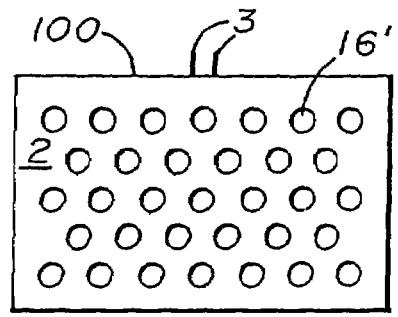
FIG. 1C is a top view of another embodiment of a die-cut sheet-style EL or other radiant panel with small circular apertures for receiving keyswitch actuation portions
Figure 1D:
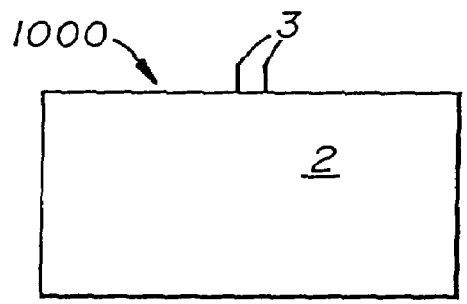
FIG. 1D is a top view of an embodiment of a continuous sheet-style EL or other radiant panel.

Referring to the Figures, there are shown several, but not the only, embodiments of the invented backlighting system for keyboard. FIGS. 1A-C illustrate electroluminescent (EL) or other light-radiant panels that may be used in the present invention. FIG. 1A is a top view of a strip-shaped electroluminescent or other light-radiant panel 1. FIG. 1B is a top view of a rectangular die-cut electroluminescent or other light-radiant panel 10 with apertures 16 for receiving a plurality of keycaps and actuation portions. FIG. 1C is a top view of a die-cut EL or other light-radiant panel 100 that has small circular apertures 16' for receiving a plurality of generally cylindrical actuation portions. FIG. 1D is a top view of an EL panel 1000 that does not require apertures because it extends continuously underneath the keyswitches. Panels 1, 10, 100, 1000 illuminate homogeneously preferably from their entire top surfaces 2, and connect to a power source at terminals 3, which power source is preferably the computer keyboard port. Alternatively, other embodiments may include masking, deactivation or other construction that results in portions of the top surfaces 2 radiating light and portions not radiating light. For example, the inventors envision embodiments in which the panels comprise portions which may not be conventionally classified as EL material, or panels which are EL material but are masked.

Panels 1, 10, 100 are preferably installed by being laid on top of the contact membrane or other circuit board so that the apertures align properly with the areas on the contact membrane corresponding to each key. The keyswitch assemblies are inserted into or over the apertures and, for embodiments with a base plate, the base plate is attached over the EL or other light-radiant panel and around the keys.

The panels 1, 10, 100, 1000 are secured in the keyboard by conventional means, such as being friction fit with one or more members, being a thin membrane sandwiched between other layers of the keyboard. The EL material may be material commonly referred to as "EL" such as that available from MetroMark, Inc. of Minnetonka, Minn., U.S.A., and may include both inorganic and/or organic EL.

Figure 2:
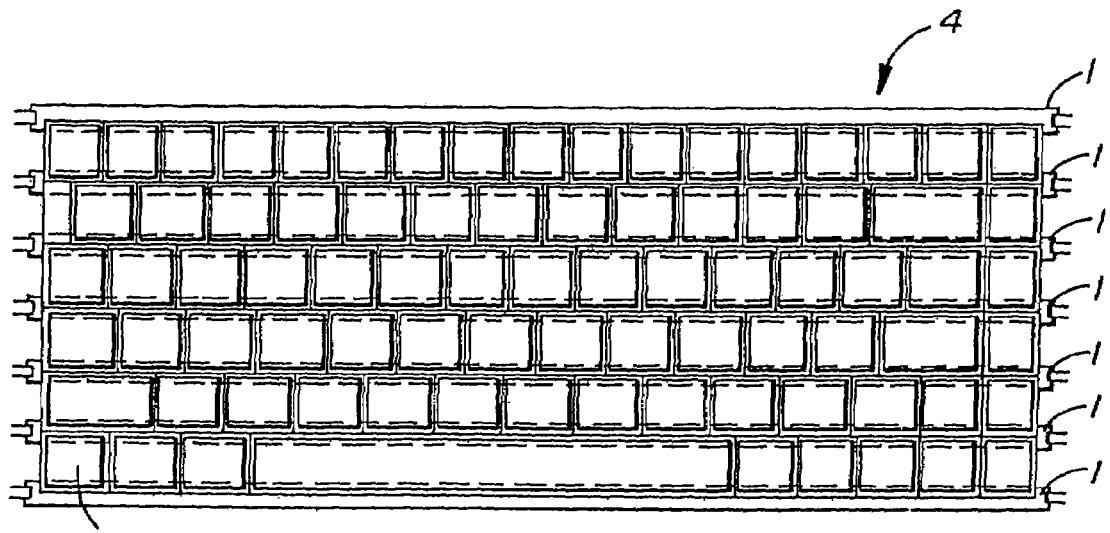
FIG. 2 is a top view of a keyboard layout with horizontal rows of strip-shaped EL or other radiant panels beneath and between the keyswitch assemblies.

FIG. 2 is a top view of a keyboard layout 4 with elongated strip-shaped electroluminescent or other light-radiant panels 1 beneath and between the keycaps 5. The panels illuminate substantially the entire keyboard layout 4 and preferably every keycap 5, due to the effect of the light from the panels 1 radiating up both between the keycaps and through the translucent keycaps 5.

FIGS. 3 and 4 illustrate cutaway side views of a keyboard assembly including discrete keyswitches 9 mounted for contact with printed circuit board 6. Each keyswitch 9 comprises keycaps 5, and an actuation portion, stem 7, which includes post 17 and actuating member 27, with at least the cap 5 and post 17 preferably being translucent or transparent. Electroluminescent or other light-radiant panels are installed on top of the circuit board 6, underneath the keycaps 5 and beside the stem 7 of each keyswitch. The EL or other light-radiant panels, as illustrated, may be either a plurality of strip panels 1 or portions of one or more sheet panels 10, 100 each having its own electrodes 3 for connection to a power source. In the case of strip panels 1, the EL or other light-radiant material extends close beside the outside surface of stems 7 on at least two sides, and, in the case of sheet panels 10, 100, the EL or other light-radiant material extends closely around the entire outside perimeter or "outer side surface 19" of stems 7. With either light-radiant panel style, the light-radiant material extends under the outer perimeter edge 11 of the keycaps 5, but not inside the keyswitch, and not through any apertures in the stem or keycaps. This way, as depicted by rays 15, the EL or other light-radiant material can radiate up from outside the keyswitch up through the cap, and also into the stem and up through the cap top.

In FIG. 3, a translucent or transparent base plate 8 is installed over the panels 1, 10, 100, which plate 8 may replace the conventional opaque base plate that forms the top of a conventional keyboard housing and that is conventionally the uppermost surface of the keyboard housing around the keycaps. In such an embodiment, light radiates up through the translucent or transparent base plate 8, as well as into and up through the keyswitches, to give an overall "glowing" effect to substantial portions of the keyboard. One may see that if the keycaps of FIG. 3 were substantially opaque with transparent or translucent indicia, then light would radiate up through the base plate 8 between the keycaps, as well as into and up through the transparent or translucent indica in the keycaps.

In FIG. 4, a partially opaque base plate 8' is installed, which includes translucent or transparent portions 80 near the keyswitches and opaque portions 180 generally centered between the keycaps. In such an embodiment, the translucent or transparent base plate portions 80 allow light to radiate up between the keycaps, while the opaque portions 180 moderate the total light visible to the user between the keycaps. By providing opaque portions 180 preferably centered between the keycaps, the keycap outer perimeters 5' are still outlined with light, but the overall lighting effect is softer and more pleasant to some users. The opaque portions of the base plate may be integral portions of the base plate or may be masking material added to the base plate. Alternatively, instead of or in addition to making portions of the base plate opaque, masking may be placed directly on or near the upper surface of the EL or other light-radiant panel(s), or portion(s) of the EL or other light-radiant panel(s) may be made to be non-radiating. Thus, selected areas of the base plate or light-radiant panels may be masked/deactivated/modified for moderating but not eliminating the light emitted up between the keycaps, or for other special design effects desired for artistic reasons or personal preference.

Figure 5:
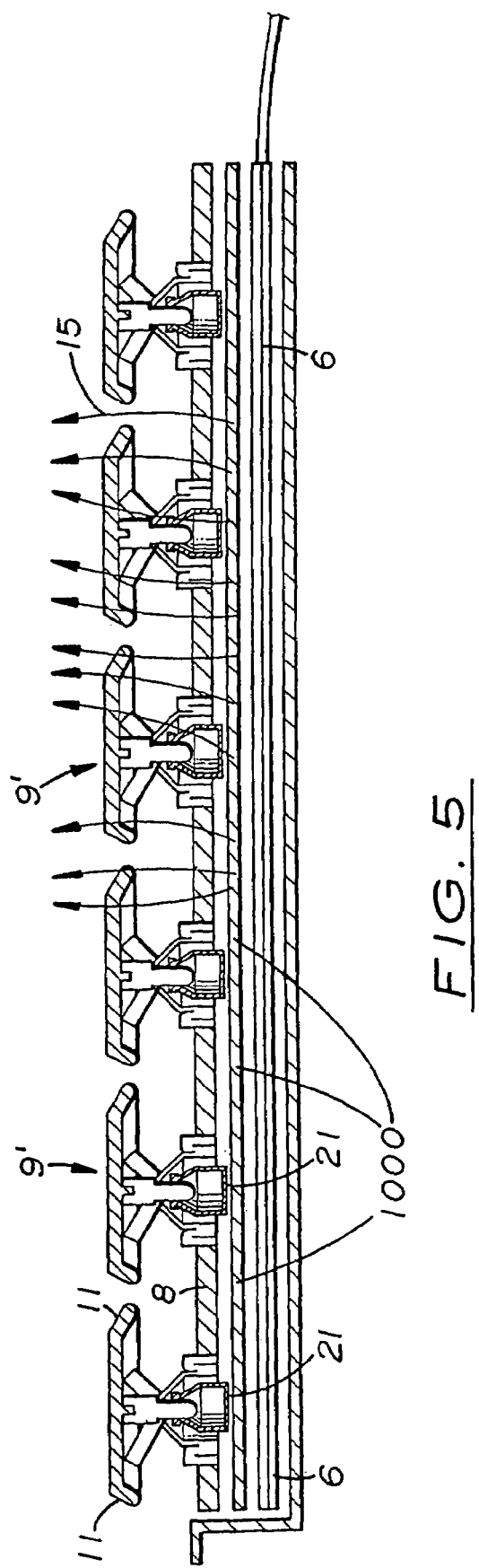
FIG. 5 is a schematic cutaway side view of another embodiment of the invention in which the EL or other radiant panel extends continuously underneath a plurality of keyswitches.

FIG. 5 illustrates in cutaway view a panel that extends continuously underneath one or more keyswitch assemblies 9'. Such a panel preferably is entirely or substantially EL or other light-radiant material so that it may described as an EL or other sheet that extends, and radiates, continuously underneath one or more keyswitch assemblies. Such a continuous sheet therefore needs no perforations for fitting around the key actuation portion or actuation path; instead, the EL or other light-radiant sheet 1000 extends across the actuation path, and the bottom end 21 of the actuation portion that is pushed down during key depression actually contacts and pushes against the sheet 1000 rather than the contact membrane. The contact of keyswitch to EL or other light-radiant sheet 1000 transfers sufficient force to the contact membrane 6 to accomplish the keyswitch's task without direct contact between the keyswitch and the contact membrane. Because the sheet 1000 extends continuously underneath the keyswitches 9', the light rays 15 may shine up through the keyswitch as well as up through the space between the keyswitches. Alternatively, the inventors envision that portions of the light-radiant sheet 1000 shown in FIG. 5 may be masked, deactivated, or made from non-radiating material, as desired for economic or aesthetic reasons.

Figure 6A:
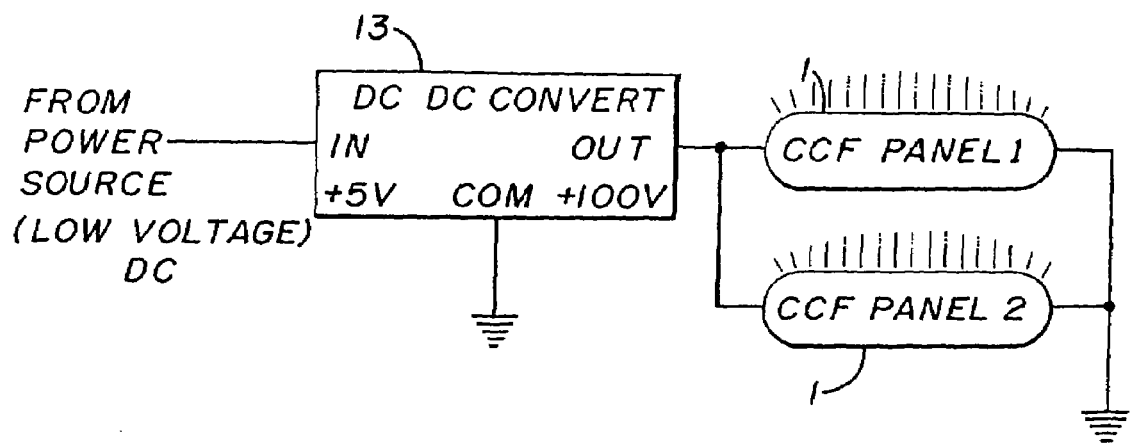
FIG. 6A is a schematic diagram of a typical EL panel wiring diagram.

FIG. 6A is a schematic diagram of a typical wiring diagram for one embodiment of the invented backlighting system. The panels 1 are connected between a common ground and a high voltage source, such as DC-to-DC converter 13, which converts +5 volts to +100 volts in this example. Multiple converters 13 may be applied to drive larger electroluminescent panels 1, or multiple panels.

Figure 6B:
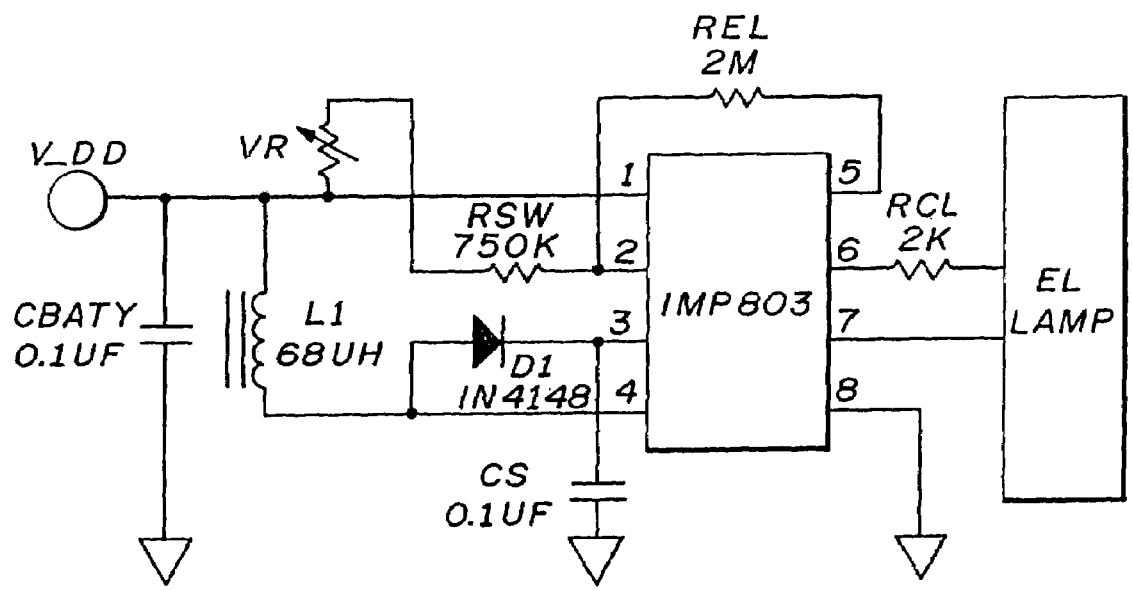
FIG. 6B is schematic diagram of an inverter system for one embodiment of the invention.

FIG. 6b is a schematic diagram of an inverter system for the invention. Other circuitry may be used and other inverter systems may be used, however, the digital inverter consumes less power than conventional toroid type invertors and so is preferred. The control system preferably includes an auto-off feature, so that the backlighting automatically turns off after a set period of un-use of the keyboard. This feature will extend the life of the battery and the EL material. A listing of materials that may be used for this circuitry follows:

TABLE 1

| Description | U/M | Schematic No. in FIG. 6B |
| --- | --- | --- |
| INVERTER IC - IMP803 | 1 | U1 |
| DIODE - 1N4148 BV = 100 V | 1 | D1 |
| VOLUME - 100K | 1 | VR |
| CHOKE COIL - 68 uH | 1 | L1 |
| CHIP CAP 0805 TYPE (+80/−20%) 0.1 UF | 2 | Cbaty, Cs |
| CHIP RESISTOR (0805 TYPE) +/−10% | | |
| 2K | 1 | Rcl |
| 2 M | 1 | Rel |
| 750K | 1 | Rsw |
| EL "LAMP" | 1 | EL LAMP |

Figure 8:
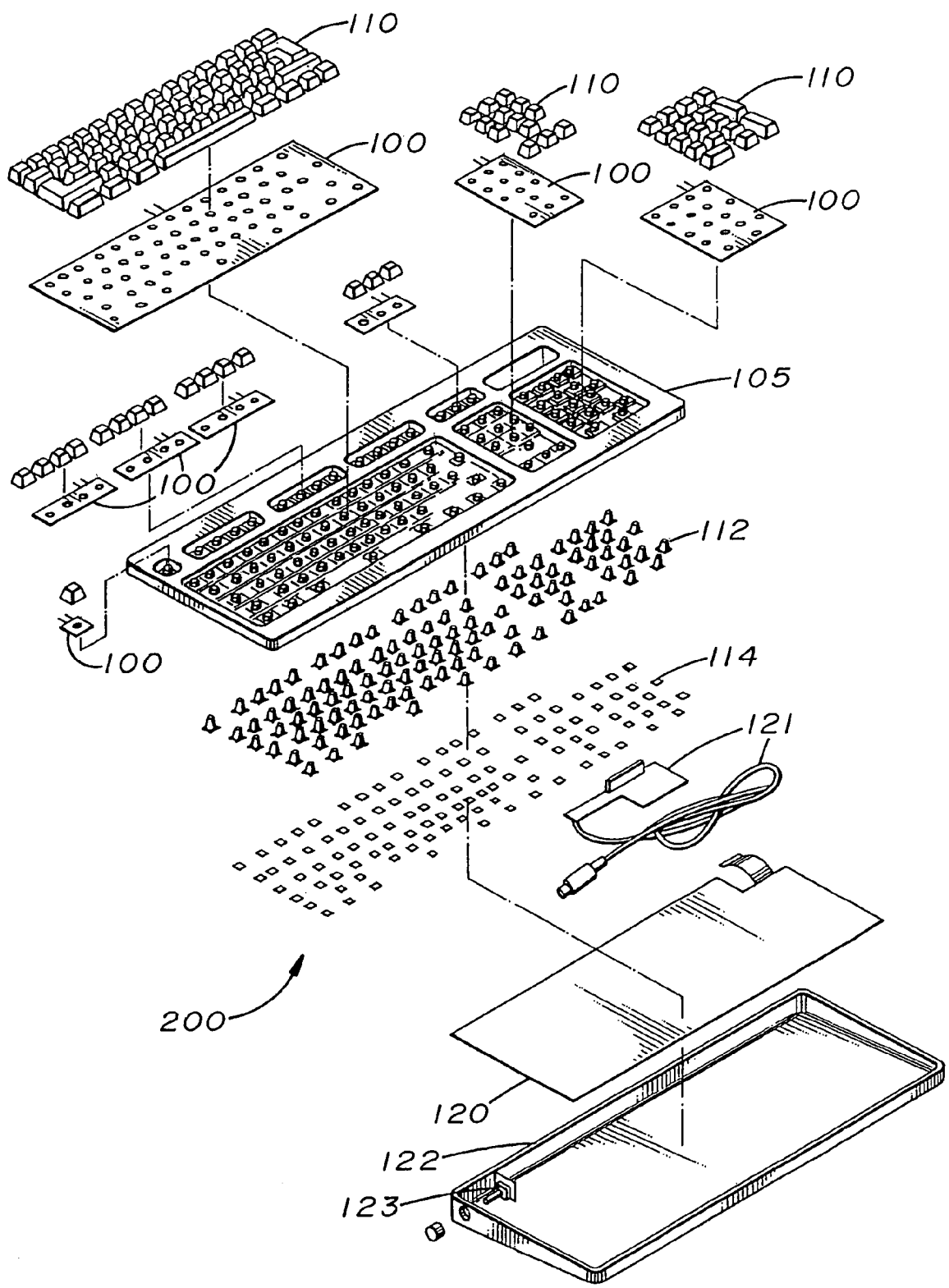
FIG. 8 is an exploded view of the pieces parts of the key board of FIG. 7.

FIGS. 7 and 8 illustrate a particularly preferred embodiment of the present invention, a desktop keyboard 200 with the invented backlighting system. EL or other light-radiant sheet(s) 100 are installed to place their apertures 16' snapped around the key collars 103 of the keyboard housing 105, which collars 103 surround the actuation portions or stems 104 of the keyswitch assemblies 106. The EL or other light-radiant sheet(s) therefore rest on top of the uppermost surface of the keyboard housing around the keys. The apertures 16' preferably have diameters the same as the outer diameters of the collars 103 for frictional engagement of the sheet 100 with the collar and so that the sheets 100 extend as near as possible to the outside surface of the stems 104.

The keyswitches, which comprise cap 110, contact insert 112, and actuator 114, are shown disassembled in FIG. 8. The contact inserts 112 slide down in the collars 103 when the key is depressed for contact the contact membrane 120. Membrane 120 is received within the bottom cabinet 122 of the keyboard 200 and cooperates with PCB and connector 121. After a key is released, the insert then slides back up to its original position as biased by the actuator 114. This keyboard 200 does not include any base plate on top of the light-radiant sheets 100, and preferably the contact insert 112 and at least a portion of the cap 110 are translucent. Therefore, the sheets 100 radiate light up between the keycaps 110, and also up through the cap 110 and through the top portion of the contact insert 112. Optionally, the key collars 103 may be translucent, which further allows light from the sheets 100 to pass through the collars 103, into the insert 112, and then up through the cap 110.

Alternatively, masking or light-radiant-sheet-deactivation/modification may be used to moderate, but preferably not eliminate, the light up between the keycaps. In FIG. 7A, an embodiment 200' is shown that includes deactivated areas 180' in the EL or other light-radiant material that are positioned directly underneath the gaps between the keycaps and that are slightly wider than the gaps 111 between keycaps. These deactivated areas 180' are positioned to be visible to the user, when he/she looks at the keyboard, so that direct light from between the keycaps is moderated, while preserving light 15 radiating up between the keycaps around the outer perimeter 110' of the keycaps. In FIG. 7A, the keycaps are substantially opaque, with translucent or transparent indicia "I" through which light radiates. Such moderation serves to balance the lighting of keycaps and/or keycap indicia with the lighting of the background around the keycaps, for a pleasant glowing keyboard in which the individual keys are easily located and comfortably used.

As shown to best advantage in FIG. 8, assembly of preferred embodiment 200 is convenient and economical because of the shape and position of the EL or other light-radiant sheets 100. The EL or other light-radiant material does not interfere with any moving parts and is received in a spaces which are not used for other purpose. As shown in FIG. 8, several different sheets 100 may be installed in various different areas of the keyboard, for example, smaller sheets under the function keys, larger sheets under the letter keys, and medium sheets under the numeric keypad. FIG. 8 illustrates one possible location for light intensity control and knob 123, but various locations may be appropriate for different keyboards. As described above, controls for independent on/off and adjustment of intensity may be included for each or some of the sheets, and may be designed from conventional technology. Also, various light colors may be used, or the sheets may be formed in other that rectangular shapes for personal taste or "designer" appeal.

Figure 10:
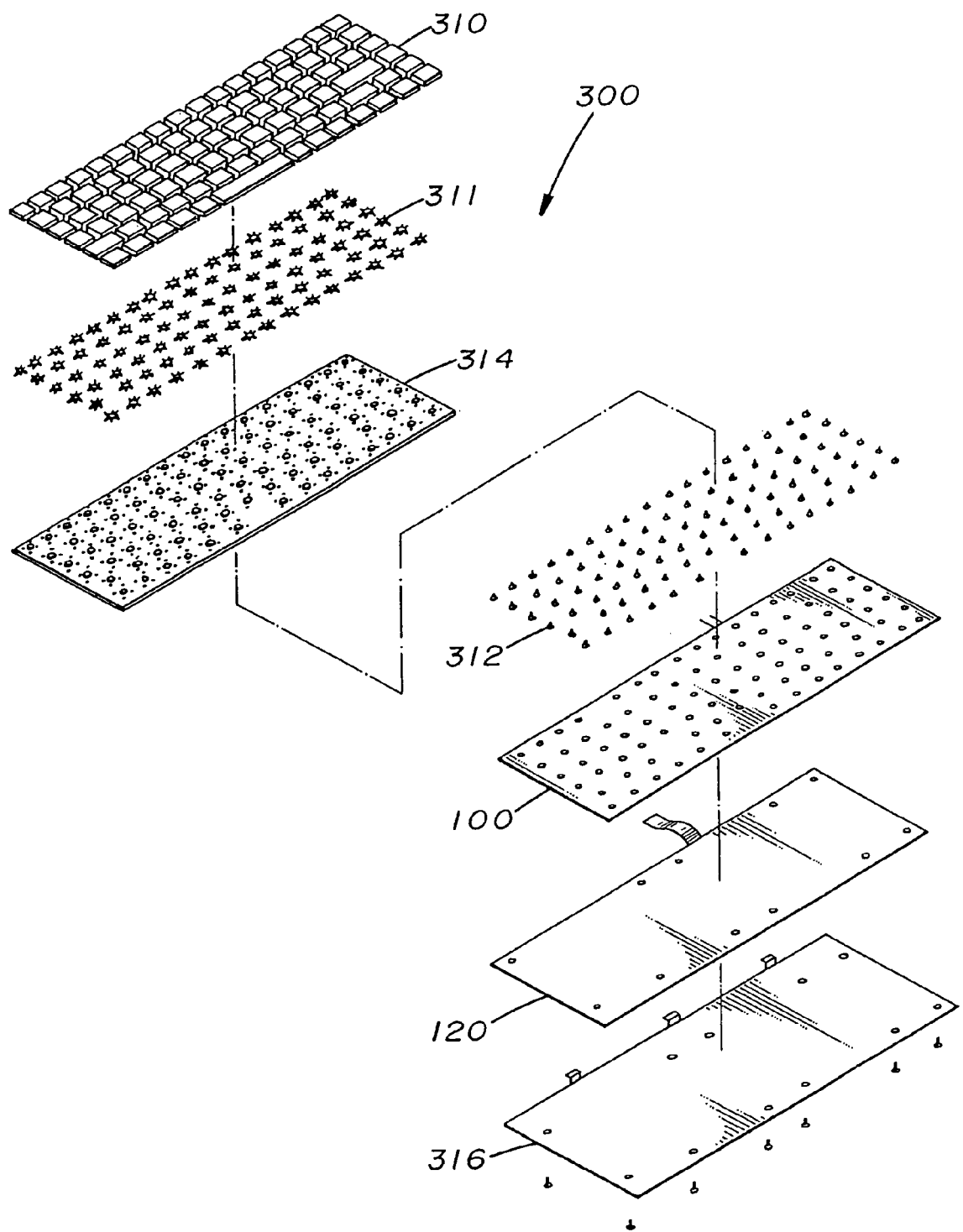
FIG. 10 is an exploded view of the pieces parts of the key board of FIG. 9.

FIGS. 9 and 10 illustrate another especially-preferred embodiment, that is, a laptop keyboard 300. This keyboard 300 includes translucent/transparent key caps 310, translucent/transparent hinges 311, translucent/transparent, rubber actuators 312 (biasing members), contact insert 313, transparent base plate 314, contact membrane 120, and metal mounting bracket 316. EL or other light-radiant sheet 100 with small round apertures 16' is positioned between and generally parallel to the contact membrane 120 and the base plate 314. Apertures 16' are positioned directly below holes in the base plate 314 which are positioned directly below the actuators 312 and the center of the key caps 310. Thus, the actuators 312, baseplate holes, and apertures 16' are all axially aligned, to define the "stem path 324" in which the "stem" travels, wherein the "stem" in this keyboard design may be considered the actuator 312 and insert 313. Thus, the edge 326 of the EL or other light-radiant material, defining the aperture 16', extends to be at or near the stem path. In other words, the EL or other light-radiant material preferably extends as far as possible under the key cap 310, without entering into any hole or passage in the keyswitch or into the interior of the keyswitch, without being centered under the cap, and without "light piping" to direct the light up to the center of the cap. This way, the EL or other light-radiant "lamp" panel shines up from the outside of the keyswitch into a substantial portion of the cap and preferably through the hinge to illuminate the key. Also, the "lamp" panel shines up through the plate 314 to provide an appropriately-lit background around the keys. Because the stroke of the laptop keyboard keys is shorter than that in a desktop keyboard, the light-radiant material delivers an adequate light output even from beneath the bottom of the clear base plate 314, and from beneath the transparent hinges 311.

FIG. 9A illustrates an alternative embodiment of the keyboard of FIG. 9, wherein masking or deactivation of selected areas 180" of the EL or other light-radiant material has been done to moderate, but not eliminate light radiating up between the keys, and especially does not eliminate light radiating up around the outer perimeters 310' of the keycaps. The masked or deactivated areas 180" are positioned below the gaps 311 and slightly rearward relative to the direction of view by the user. Thus, in FIG. 9A, because the user typically views the keyboard from the right of the Figure, the deactivated areas 180" are beneath the gaps 311 and slightly to the left. In FIG. 9A, the keycaps are substantially opaque, with translucent or transparent indicia "I" through which light radiates. Such moderation serves to balance the lighting of keycaps and/or keycap indicia with the lighting of the background around the keycaps, for a pleasant glowing keyboard in which the individual keys are easily located and comfortably used.

As illustrated in FIGS. 4, 7A and 9A and described above, masking or opaque areas on base plates, or masking, deactivation, or modification of EL or other light-radiant material may be used to moderate the light radiating up between the keycaps, so that a user normally does not directly view the light-emitting areas, which may be too bright for the preferences of some users, when the user is positioned in a typical position in front of the keyboard for normal use of the keyboard. The masking, opaque areas, or non-light-emitting areas are preferably generally centered in the space directly below the gap between outer perimeters of the caps, wherein "generally centered" also includes some shifting of the position forward or rearward or to a side to properly shield the user eyes from the bright areas. The masking, opaque areas, or non-light-emitting areas preferably do not cover the entire distance between keyswitches, so that some light may still radiate and/or reflect up around the masking, opaque areas, or non-light-emitting areas to illuminate the outside of the keycap outer perimeter edges 5', 110', 310'. As schematically represented in FIGS. 4, 7A and 9A, the light-emitting areas near the outer perimeters radiate light up through the gap at an angle to the light-emitting panel rather than straight up through the gap. Preferably, the masking or radiant-material-deactivation/modification may cover only up to about 80% of the distance between the keystems or actuation portions, and, more preferably, only up to about 50% of the distance. The specific amount of masking or deactivation (or modification to make areas of the light-radiant panel non-light-emitting) that is optimal depends on the shape and spacing of the keycaps, and the particular user.

To provide a user with further fine-tuning of the light, the preferred dimming controls may be used. While FIGS. 4, 7A and 9A show cross-sections along one plane in each keyboard, one may understand from these drawings that the masking, deactivation/modification may extend around the keys on all sides of the keys.

As shown to best advantage in FIG. 10, assembly of keyboard 300 is efficient and convenient, because of the approach of installing the EL or other light-radiant panel 100 as a thin, planar sheet parallel to and in between already existing planar members of the keyboard. Enlargements of several of the pieces parts of keyboard 300 are shown in FIGS. 1A-C for clarity.

Figure 12:
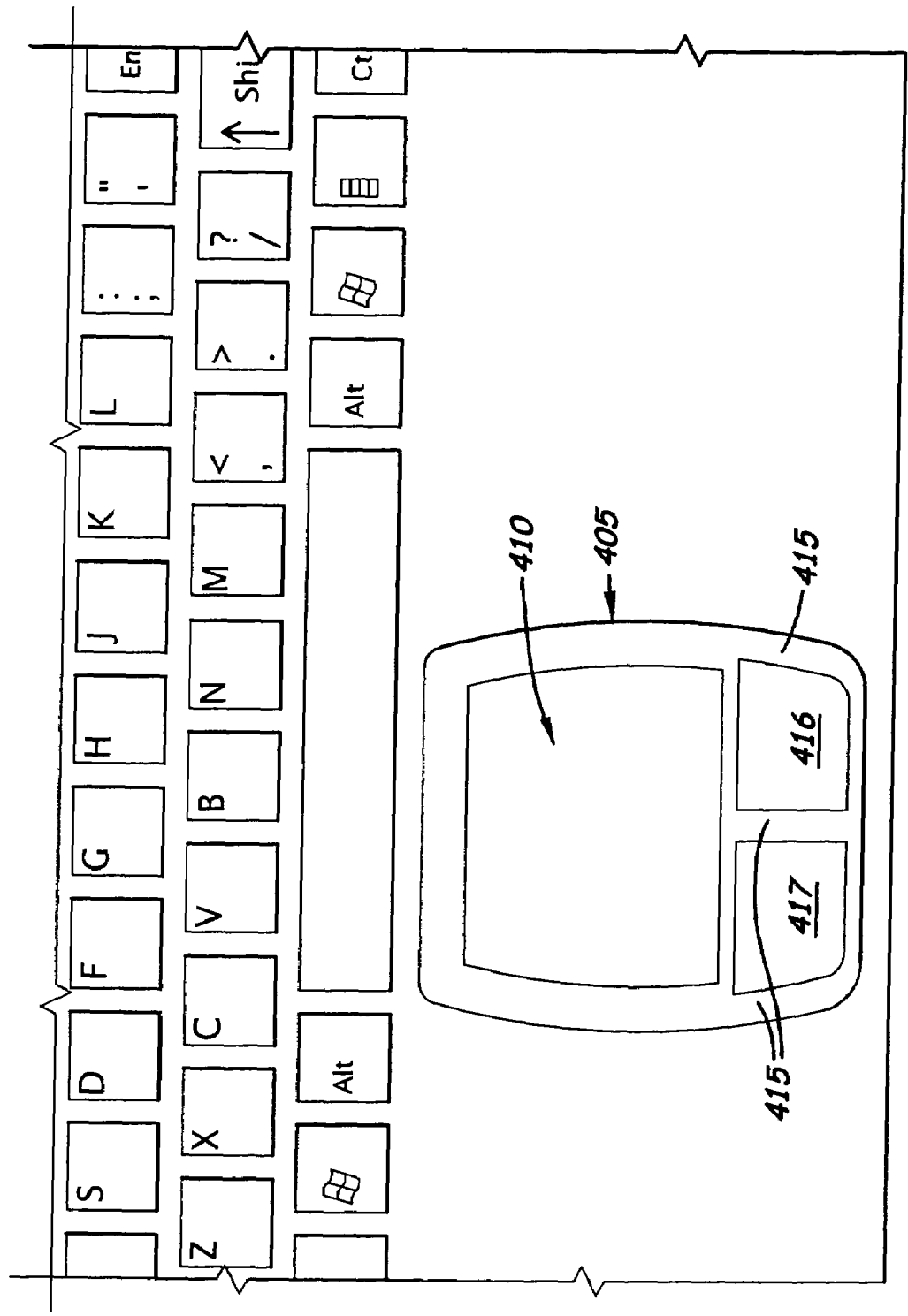
FIG. 12 is a schematic top view of an embodiment including backlighting around a touch pad on a laptop computer.

FIG. 12 illustrates an embodiment 400 in which backlighting is provided to illuminate or outline a touch pad for a laptop computer keyboard, wherein the touch pad takes the place of an external mouse device. The rim or frame 405 around the touch pad 410 may also include framing sections 415 that surround or define a right control 416 and left control 417 (or right and left "click") or other controls. A part or all of the rim or frame 405 is preferably lit from below the top surface of the frame 405, by means of EL or other light-radiant material extending under at least part of the frame 405. In such embodiments, part or all of the frame 405 would be transparent or translucent to allow light to radiate up to the user's eyes. As in the keyswitch assembly backlighting, masking, deactivation, or other modifications could be used to moderate the lighting or create artistic or preferred effects. This way, the invention may include backlighting of the touch pad, and/or the right and left controls, and/or other controls important to the operation of the keyboard and/or computer. This touch pad lighting may be controlled by the same controls that control the backlighting around the keyswitch assemblies, or may be controlled separately.

Figure 13:
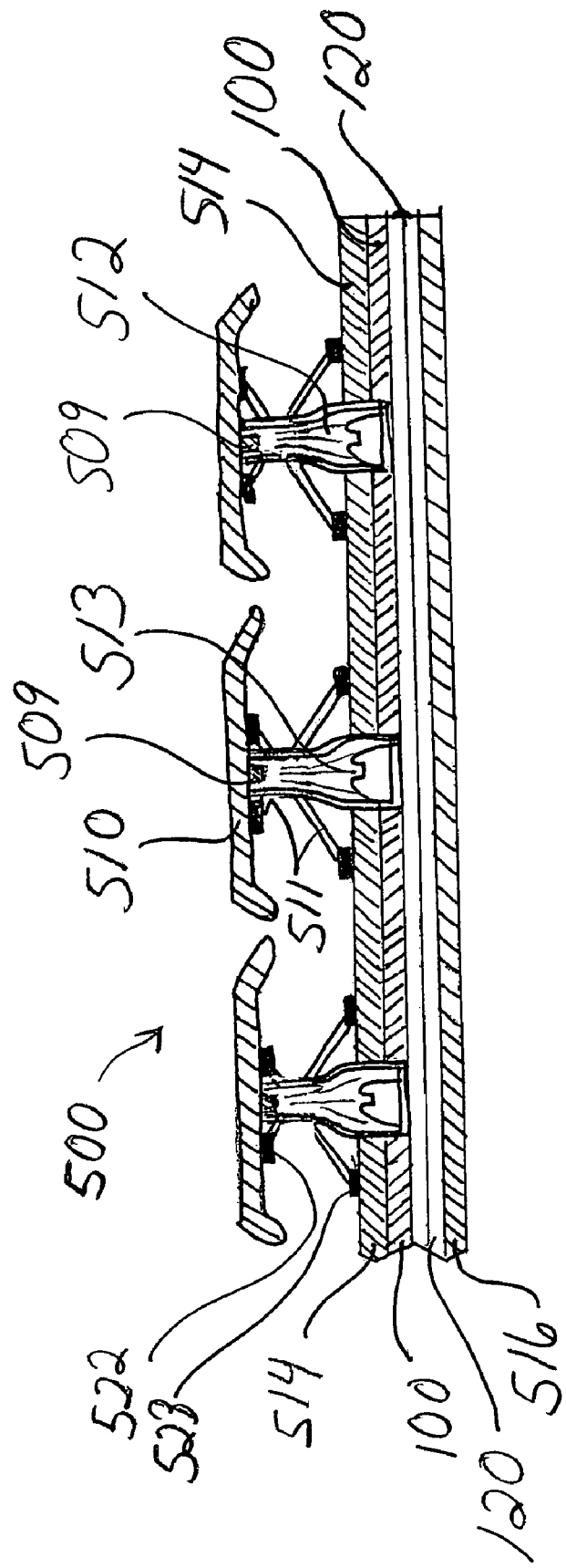
FIG. 13 is another alternative embodiment of a keyboard using a radiant panel inside the housing and underneath a transparent or translucent, or substantially transparent or translucent, top housing plate.

FIG. 13 illustrates alternative embodiment 500. In keyboard embodiment 500, a light-radiant sheet 100, preferably of LEC, is positioned inside the housing and underneath the substantially or wholly translucent or transparent base plate 514 (the uppermost, generally horizontal plate of the housing). In keyboard 500, the housing comprises base plate 514 and bottom housing plate 516, and the circuit board or membrane is illustrated as membrane 120. Keyswitch assemblies comprise cap 510 with indexing post 509, hinge 511, rubber biasing member/actuator member 512 with insert/contact member 513. In use, cap 510 is pushed, which in turn forces member 512 down, to affect the switching of membrane 120. The hinges 511 may be operatively connected to the cap 510 by various styles of connection (522), and may be operatively connected/supported by the base plate 514 by various styles of connection (523).

Figure 14:
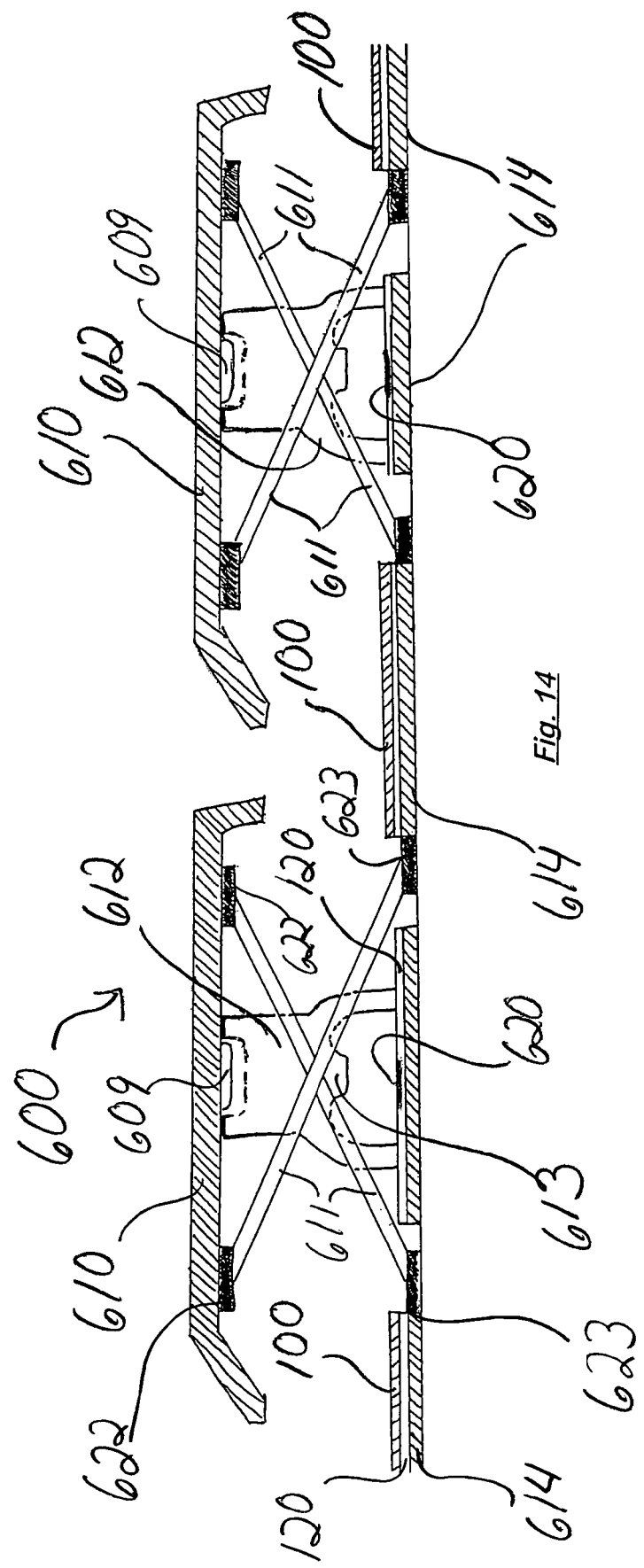
FIG. 14 is another alternative embodiment of a keyboard using a radiant panel above the top plate of the keyboard housing and above the circuit membrane, so that the radiant panel is the uppermost generally horizontal panel of the keyboard and yet is still below and extending underneath the keycaps.

FIG. 14 illustrates alternative embodiment 600. In keyboard embodiment 600, a light-radiant sheet 100, preferably of LEC, is positioned on top of the housing, above circuit membrane 120 (having switches 620), and above base plate 614 (the uppermost, generally horizontal plate of the housing). In keyboard 600, the housing comprises base plate 614 and a bottom housing plate not shown in this schematic view. Keyswitch assemblies comprise cap 610 with indexing post 609, hinge 611, rubber biasing member/actuator member 612 with insert/contact member 613. In use, cap 610 is pushed, which in turn forces member 612 down, to effect the switching of membrane switch 620. The hinges 611 may be operatively connected to the cap 610 by various styles of connection (622), and may be operatively connected/supported by the base plate 614 by various styles of connection (623).

The nature and position of the EL or other light-radiant material in the preferred embodiments also provides the benefit of increased resistance to liquid spills. Having a continuous or near-continuous panel of the light-radiant material extending between and/or under the keyswitches blocks liquid and moisture from reaching the PCB/contact membrane.

Various materials may be used for the parts of the invented system. For example, transparent key caps may be ABS or P.C. plastic; transparent hinges may be nylon or P.C.; transparent or semi-transparent "rubber" actuators may be silicone rubber, Latex, or rubber; transparent or white contact inserts may be POM or nylon; transparent base plates may be ABS or P.C., and lower housing members may be metal or plastic. Other materials may be chosen for the desired translucency and/or color, with durability of the material as a main objective.

The invented keyboard lighting system, with its many possibilities for different colors, patterns of light, and light adjustments, may be designed for the many individual tastes and needs of people in the market. The invented system offers advantages for young people who desire a stylish keyboard, senior or visually-impaired citizens who need help reading the keyboard, or others who are tired of the conventional computer look.

The invention that has been described is effective in providing illumination of a keyboard or different types of keyswitch assemblies, for example, many keyswitch assemblies made with conventional materials by conventional techniques. An important object of the present invention is to provide effective backlighting to keyboards and keyswitches of conventional design, rather than requiring significant redesign of keyboards and keyswitches.

Although this invention has been described above with reference to particular means, materials and embodiments, it is to be understood that the invention is not limited to these disclosed particulars, but extends instead to all equivalents within the scope of the following claims.

The invention claimed is:

1. A backlit computer keyboard comprising:
   a keyboard housing;
   a circuit board or membrane;
   a plurality of keyswitches operatively connected to said housing, each keyswitch having a cap portion for being forced downward by a user and having a translucent or transparent portion, and an actuation portion between the cap portion and the circuit board or membrane for transmitting force to the circuit board to effect switching of the circuit board or membrane;
   a substantially planar panel of light-emitting material above said housing and above said circuit board or membrane, wherein the panel of light-emitting material extends between and underneath said cap portions and is the uppermost generally horizontal panel of the keyboard beneath the cap portions;
   wherein said panel emits light directly up through said keyswitches by passing through said translucent or transparent portion of each cap portion; and
   the keyboard further comprising gaps between said cap portions, and wherein the cap portions each have an outer perimeter and wherein said panel comprises non-light-emitting areas directly below the gaps so that the panel radiates light from near the outer perimeters up through the gaps at an angle to said panel but so that the panel does not radiate light straight up from below the centers of the gaps.

2. A backlit keyboard as in claim 1, wherein the panel of light-emitting material comprises a light-emitting electrochemical cell.

3. A backlit keyboard as in claim 1, wherein the panel is an electroluminescent membrane.

4. A backlit keyboard as in claim 1, further comprising a control device that automatically turns off the light emitted by said panel after a period of inactivity of the keyboard.

* * * * *